United States Patent
Sumiyoshi et al.

(10) Patent No.: US 8,611,645 B2
(45) Date of Patent: Dec. 17, 2013

(54) APPARATUS, METHOD AND NON-TRANSITORY COMPUTER READABLE MEDIUM TO PERFORM IMAGE RECOGNIZING USING DICTIONARY DATA

(75) Inventors: Masato Sumiyoshi, Tokyo (JP); Manabu Nishiyama, Kawasaki (JP); Tomoki Watanabe, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 138 days.

(21) Appl. No.: 13/229,625

(22) Filed: Sep. 9, 2011

(65) Prior Publication Data

US 2012/0243778 A1 Sep. 27, 2012

(30) Foreign Application Priority Data

Mar. 25, 2011 (JP) ................. 2011-068316

(51) Int. Cl.
*G06K 9/62* (2006.01)

(52) U.S. Cl.
USPC ........................................ 382/159

(58) Field of Classification Search
None
See application file for complete search history.

(56) References Cited

U.S. PATENT DOCUMENTS

| | | | |
|---|---|---|---|
| 2008/0080744 A1* | 4/2008 | Tanaka ..................... | 382/118 |
| 2009/0290799 A1 | 11/2009 | Matsuzaka | |
| 2010/0034459 A1 | 2/2010 | Ito et al. | |
| 2010/0034465 A1* | 2/2010 | Watanabe et al. ............ | 382/190 |
| 2011/0286628 A1* | 11/2011 | Goncalves et al. ........... | 382/103 |
| 2012/0275653 A1* | 11/2012 | Hsieh et al. .................. | 382/105 |

FOREIGN PATENT DOCUMENTS

| | | |
|---|---|---|
| JP | 2009-282699 | 12/2009 |
| JP | 2010-282340 A | 12/2010 |

OTHER PUBLICATIONS

Masayuki, H. et al. "Hardware Architecture for High- Accuracy Real-Time Pedestrian Detection with CoHOG Features".
Office Action dated Jun. 7, 2013 of corresponding Japanese Patent Application 2011-068316—4 pages.

* cited by examiner

*Primary Examiner* — Nirav G Patel
(74) *Attorney, Agent, or Firm* — Knobbe, Martens, Olson & Bear LLP

(57) ABSTRACT

An image recognizing apparatus includes a dictionary memory, a block determining module and a recognizing module. The dictionary memory stores dictionary data. The block determining module determines that a target block comprising a target pixel to be processed of a plurality of pixels in image data is a shared block to which the dictionary data is used or a mirror block to which the dictionary data to the shared block is used, based on a position of the target block. The recognizing module uses common dictionary data for the shared block and the mirror block, and recognizes a characteristic portion of the image expressed by the image data.

17 Claims, 16 Drawing Sheets

| | | | | | FIRST WEIGHT SET 0 |
|---|---|---|---|---|---|
| W0(0,0) | W0(1,0) | ... | W0(7,0) | ... | NULL |
| W1(0,1) | W1(1,1) | ... | W1(7,1) | ... | W1(63,1) ─ SECOND WEIGHT SET 1 |
| ... | ... | ... | ... | ... | ... |
| W33(0,33) | W33(1,33) | ... | W33(7,33) | ... | W33(63,33) ─ SECOND WEIGHT SET 33 |
| W34(0,34) | W34(1,34) | ... | W34(7,34) | ... | W34(63,34) ─ SECOND WEIGHT SET 34 |

| COORDINATE X | KIND OF BLOCK | EM | ADD_M |
|---|---|---|---|
| 1 | FIRST BLOCK | 0 | ADD_M (1) |
| 0 | SECOND BLOCK | 0 | ADD_M (2) |
| 2 | THIRD BLOCK | 1 | ADD_M (3) |

| TRAGET GRADIENT INFORMATION (G0) | FIRST REFERENCE ADDRESS (ADD_REF0) |
|---|---|
| 0~7 | ADD_M+G0 |
| 8 | UN-GENERATED |

FIG. 9

| TARGET GRADIENT INFORMATION (G0) | COOCCURRENCE GRADIENT INFORMATION (Gk) | SECOND REFERENCE ADDRESS (ADD_REFk) |
|---|---|---|
| 0 | 0 | ADD_M+C1 |
| 0 | 1 | ADD_M+C2 |
| ... | ... | ... |
| 7 | 7 | ADD_M+C64 |
| 8 | *** | UN-GENERATED |
| *** | 8 | UN-GENERATED |

FIG. 10

| KIND OF TARGET BLOCK | MIRROR ENABLE SIGNAL (EM) | VALUE OF GRADIENT INFORMATION |
|---|---|---|
| FIRST BLOCK | 0 | G |
| SECOND BLOCK | 0 | G |
| THIRD BLOCK | 1 | G |

00011110(2)  00111100(2)

APPARATUS, METHOD AND NON-TRANSITORY COMPUTER READABLE MEDIUM TO PERFORM IMAGE RECOGNIZING USING DICTIONARY DATA

CROSS REFERENCE TO RELATED APPLICATIONS

This application is based upon and claims the benefit of priority from the prior Japanese Patent Application No. 2011-068316, filed on 25 Mar., 2011, the entire contents of which are incorporated herein by reference.

FIELD

Embodiments described herein relate generally to an image recognizing apparatus, a method for recognizing an image and a non-transitory computer readable medium.

BACKGROUND

Recently, an image recognizing apparatus that recognizes a characteristic portion of image using dictionary data of SVM (Support Vector Machine) is provided in an automobile. A dictionary memory in which the dictionary data is stored is provided in the image recognizing apparatus. The image recognizing apparatus divides the image into plural blocks, and refers to the dictionary data stored in the dictionary memory in each block to recognize the characteristic portion of the image.

However, in the conventional image recognizing apparatus, the dictionary data is prepared in each block. The different dictionary data is used in each block even if images of two blocks are similar to each other (for example, one of the blocks is a mirror of the other block). Accordingly, a data amount of the dictionary data is increased in proportion to the number of blocks, thereby increasing a capacity of the dictionary memory in which the dictionary data is stored.

BRIEF DESCRIPTION OF THE DRAWINGS

FIG. 4 is a view illustrating the dictionary data D of the embodiment.

FIG. 9 is a schematic diagram of a first reference table of the first embodiment.

FIG. 10 is a schematic diagram of a second reference table of the first embodiment.

DETAILED DESCRIPTION

Embodiments will now be explained with reference to the accompanying drawings.

In one embodiment, an image recognizing apparatus includes a dictionary memory, a block determining module and a recognizing module. The dictionary memory stores dictionary data. The block determining module determines that a target block comprising a target pixel to be processed of a plurality of pixels in image data is a shared block to which the dictionary data is used or a mirror block to which the dictionary data to the shared block is used, based on a position of the target block. The recognizing module uses common dictionary data for the shared block and the mirror block, and recognizes a characteristic portion of the image expressed by the image data.

Figure 1:
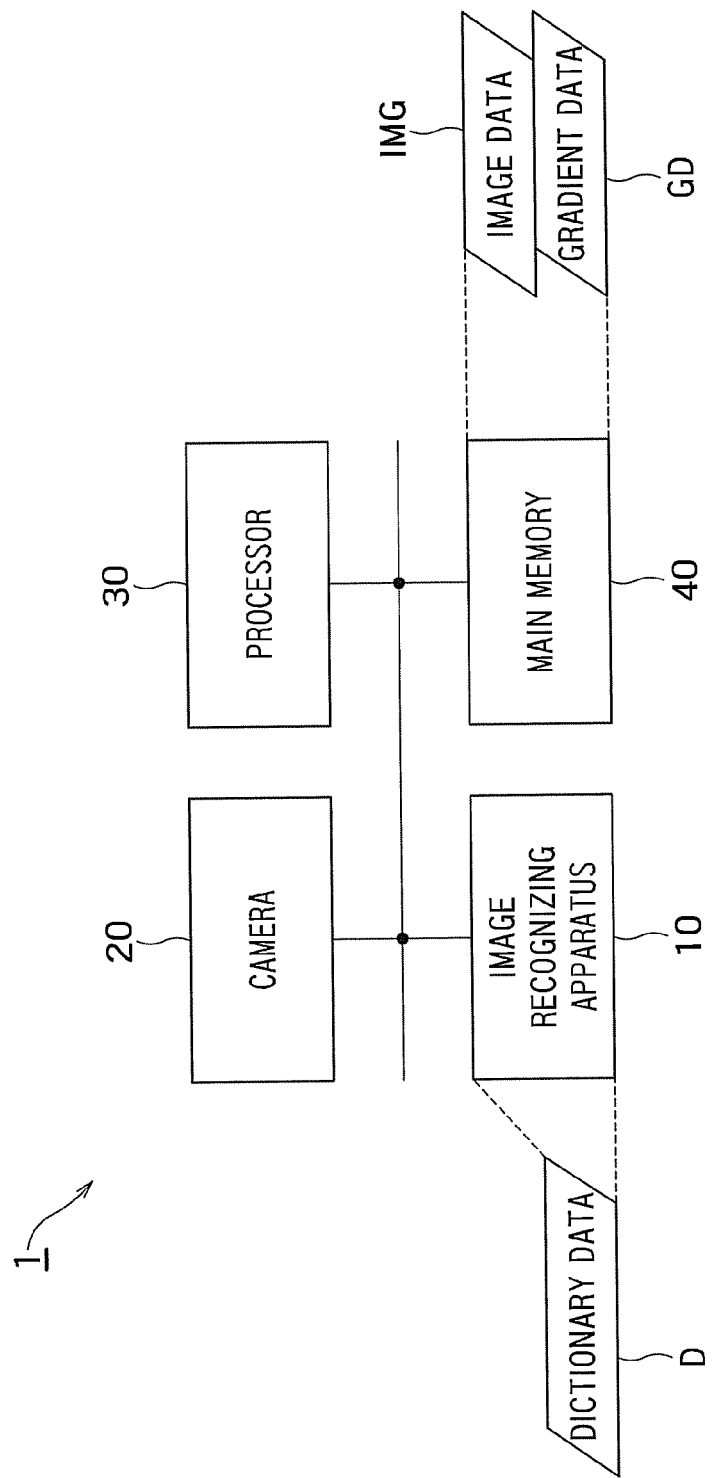
FIG. 1 is a block diagram of an image recognizing system 1 of the embodiment.

FIG. 1 is a block diagram of an image recognizing system 1 of the embodiment. The image recognizing system 1 includes an image recognizing apparatus 10, a camera 20, a processor 30 and a main memory 40. The camera 20 is an apparatus (for example, an in-vehicle camera) that takes an image. The processor 30 is a module (for example, CPU (Central Processing Unit)) that generates image data IMG expressing the image taken with the camera 20 and generates gradient data GD based on the image data IMG. The main memory 40 is a storage medium (for example, DRAM (Dynamic Random Access Memory)) in which various pieces of data such as the image data IMG and the gradient data GD, generated by the processor 30, are stored. The image recognizing apparatus 10 is an apparatus that generates a CoHOG (Co-occurrence Histogram of Oriented Gradient) characteristic value based on the gradient data GD and recognizes a characteristic portion (for example, person) of the image using dictionary data D of the SVM.

Figure 2:
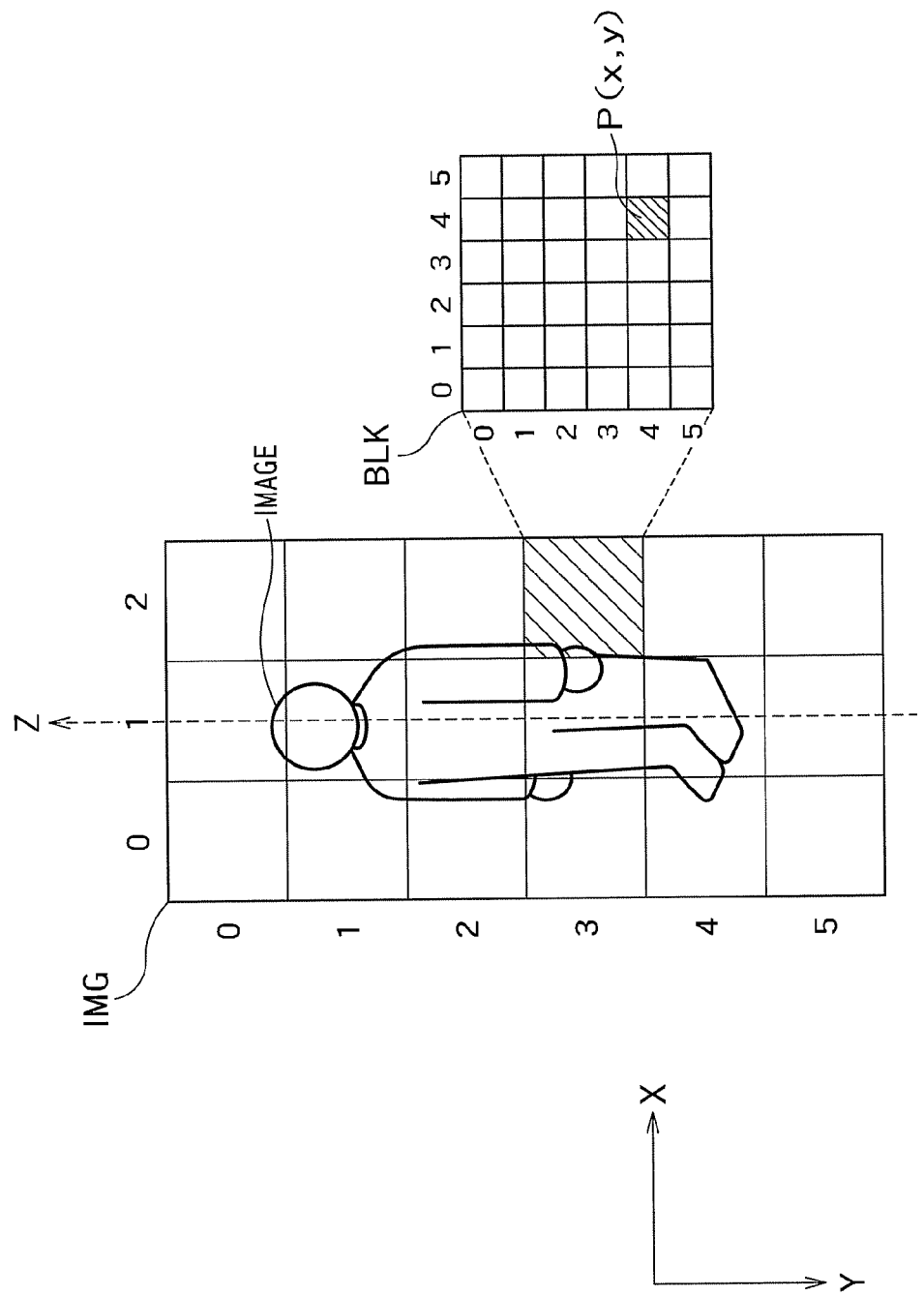
FIG. 2 is a schematic diagram of the image data IMG of the embodiment.

FIG. 2 is a schematic diagram of the image data IMG of the embodiment. The image data IMG includes plural (for example, 18 (=3×6)) blocks BLK. A block coordinate (coordinate X and coordinate Y) is allocated to each block BLK. Each block BLK includes plural (for example, 36 (=6×6)) pixels P. In the embodiment, one piece of image data IMG includes any number of blocks BLK, and one block BLK includes any number of pixels P.

Figure 3A:
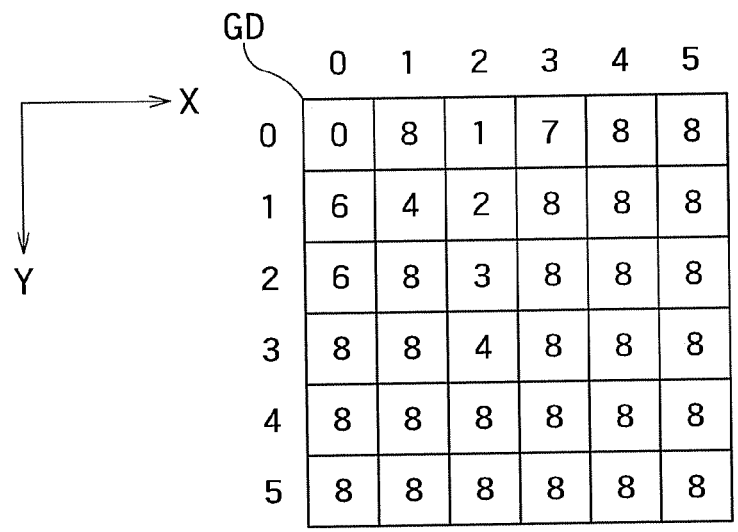
FIGS. 3A and 3B are views illustrating the gradient data GD of the embodiment.
Figure 3B:
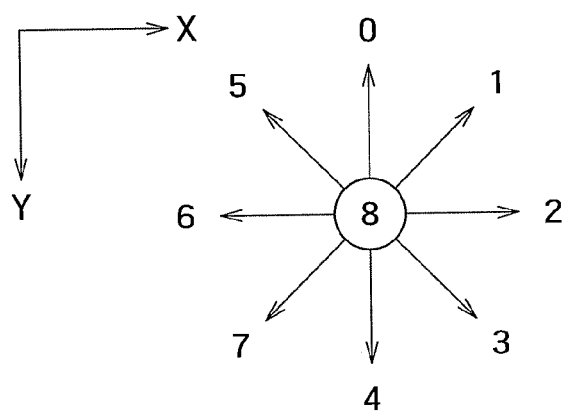

FIG. 3 is a view illustrating the gradient data GD of the embodiment. When generating the image data IMG expressing the image taken with the camera 20, the processor 30 divides the generated image data IMG into plural blocks BLK, filters each block BLK in an X-direction and a Y-direction to generate an X-component and a Y-component of each pixel P, calculates a gradient direction of each pixel P based on the generated X-component and Y-component, quantizes the calculated gradient direction into 8 values, and generates 8-value gradient information G(x,y) (see FIG. 3A). The gradient information G(x,y) indicates the gradient direction of a pixel P(x,y). For example, the gradient information G(x,y) is one of gradient values of 0 to 7 indicating the gradient direction (eight directions) or a gradient value of 8 indicating that the gradient does not exist (see FIG. 3B).

FIG. 4 is a view illustrating the dictionary data D of the embodiment. The dictionary data D includes plural weight sets (first weight set 0 and second weight set k (k is an integer of at least 1)). The first weight set 0 includes 8 first weights W0(0,0) to W0(7,0) corresponding to the gradient direction of the target pixel to be processed in plural pixels constituting the image data IMG. Each of the first weights W0(0,0) to W0(7,0) indicates a weight of the gradient direction of the target pixel that is taken into account in recognizing the image. The second weight set k includes 64 second weights Wk(0,k) to Wk(63,k) corresponding to a combination of the gradient direction of a co-occurrence pixel having a co-occurrence relationship with the target pixel and the gradient direction of the target pixel. Each of the second weights Wk(0,k) to Wk(63,k) indicates a weight of the combination of the gradient direction of the co-occurrence pixel that is taken into account in recognizing the image and the gradient direction of the target pixel. Where k is the number of co-occurrence pixels that are taken into account in recognizing the image.

First Embodiment

Figure 5:
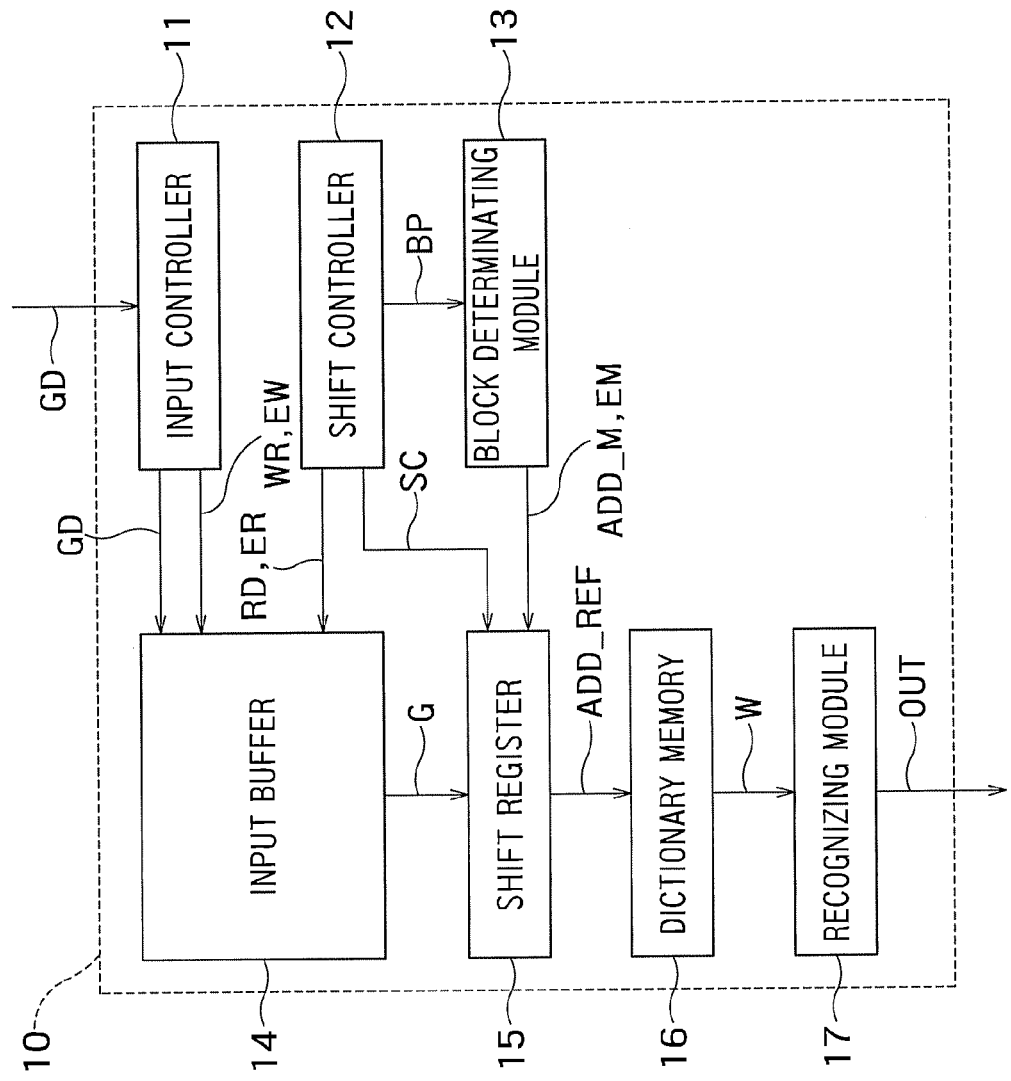
FIG. 5 is a block diagram of the image recognizing apparatus 10 of the first embodiment.

A first embodiment will be explained below. In the first embodiment, by way of example, position information and the gradient value of the gradient information are inverted based on a mirror relationship. FIG. 5 is a block diagram of the image recognizing apparatus 10 of the first embodiment. The image recognizing apparatus 10 includes an input controller 11, a shift controller 12, a block determining module 13, an input buffer 14, a shift register 15, a dictionary memory 16, and a recognizing module 17.

Figure 6:
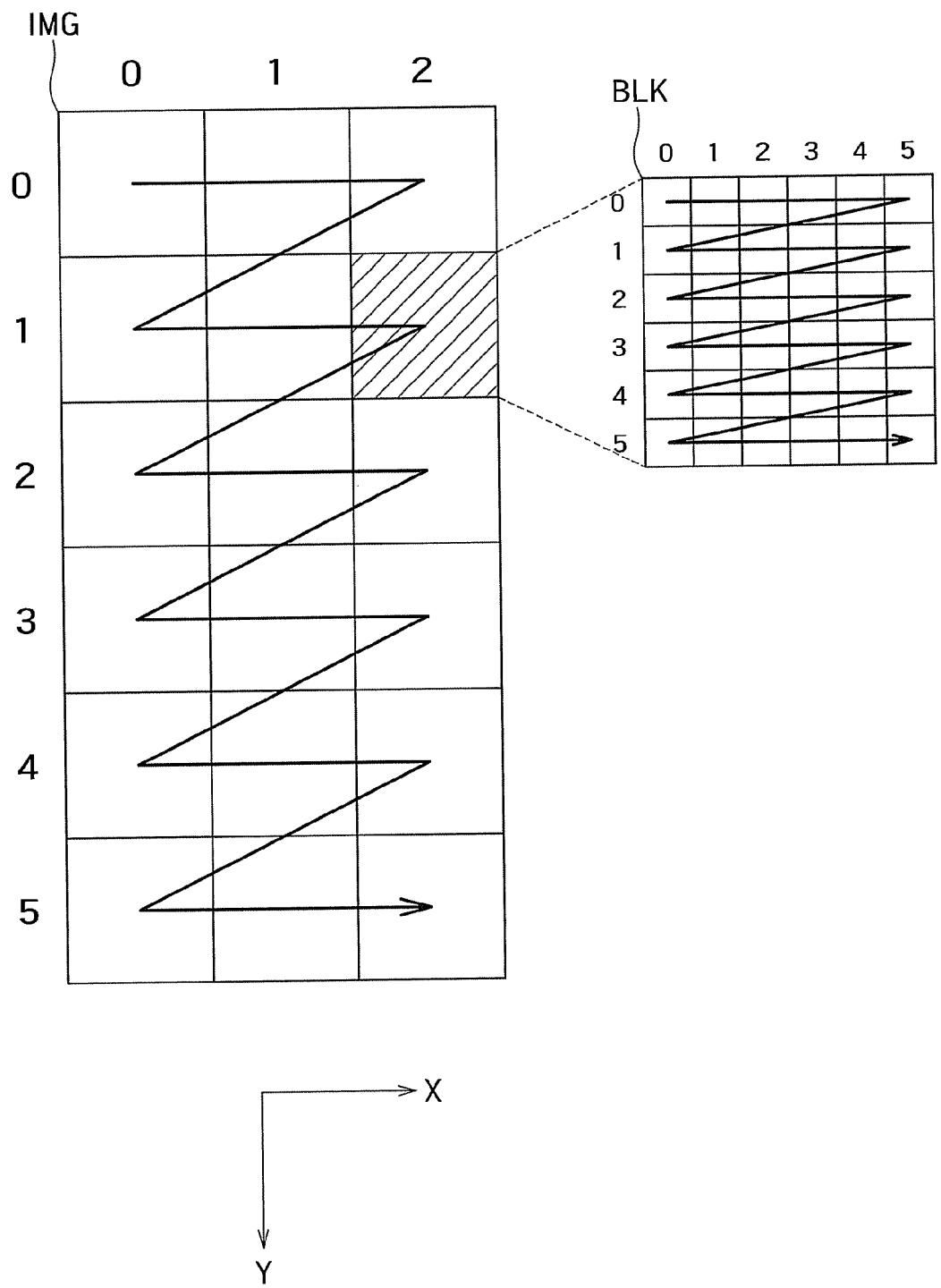
FIG. 6 is a view illustrating order of raster scan.

The input controller 11 controls transfer of the gradient data GD to the input buffer 14. The input controller 11 reads the gradient data GD from the main memory 40, generates a write address WR indicating a location on the input buffer 14 in which the gradient data GD is written and a write enable signal EW that enables the gradient data GD to be written in the input buffer 14, and outputs the write address WR, the write enable signal EW and the gradient data GD to the input buffer 14. For example, the input controller 11 generates the write address WR such that the gradient data GD is stored in the input buffer 14 in the order of raster scan in units of blocks (see FIG. 6).

The shift controller 12 controls the shift register 15. The shift controller 12 generates a read address RD indicating a location on the input buffer 14 from which the gradient data GD is read and a read enable signal ER that enables the gradient data GD to be read from the input buffer 14, and outputs the read address RD and the read enable signal ER to the input buffer 14. The shift controller 12 also generates a shift control signal SC that enables the gradient information on the target pixel (hereinafter referred to as "target gradient information") to be shifted in the predetermined order (for example, in the order of the raster scan), and outputs the shift control signal SC to the shift register 15. The shift controller 12 outputs block position information BP indicating a block coordinate of the target block to be processed to the block determining module 13.

Figures 7, 8:
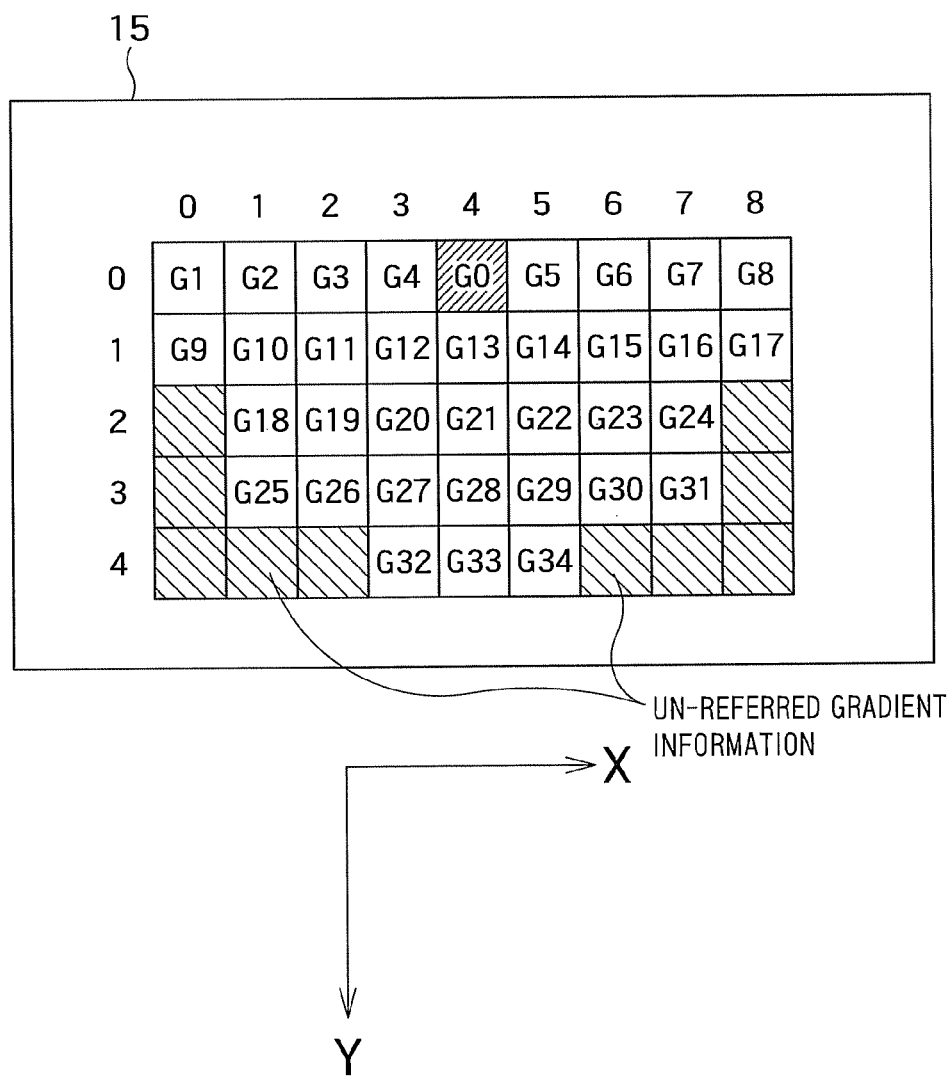
FIG. 7 is a schematic diagram of the determination table of the first embodiment.
FIG. 8 is a schematic diagram of the shift register 15 of the first embodiment.

The block determining module 13 determines a type of the target block based on the block position information BP and prepared determination table. Therefore, the target block is classified under first to third blocks. FIG. 7 is a schematic diagram of the determination table of the first embodiment. The block having the coordinate X of 1 of the block position information BP (that is, the block on a Z-axis) is the first block (unshared block). The block having the coordinate X of 0 of the block position information BP (that is, the block whose coordinate X is located on one side in relation to the Z-axis) is the second block (shared block). The block having the coordinate X of 2 of the block position information BP (that is, the block located on the mirror position to the second block) is the third block (mirror block). The first dictionary data for the first block and the second dictionary data for the second block are previously stored in the dictionary memory 16, while the dictionary data for the third block is not stored in the dictionary memory 16. The first and second dictionary data are prepared in each block. For example, in FIG. 2, six each of the first and second pieces of dictionary data are prepared. The first dictionary data is used exclusively for the unshared block. The second dictionary data is used not only for the shared block but also for the mirror block.

The block determining module 13 generates a mirror enable signal EM and a dictionary address ADD_M according to the block position information BP, and outputs the mirror enable signal EM and the dictionary address ADD_M to the shift register 15. The mirror enable signal EM enable an operation of the shift register 15 to be switched. The dictionary address ADD_M is an address on the dictionary memory 16 of dictionary data D used for the target block. For example, the block determining module 13 generates the mirror enable signal EM=0 and a first dictionary address ADD_M(1) for the first block, generates the mirror enable signal EM=0 and a second dictionary address ADD_M(2) for the second block, and generates the mirror enable signal EM=1 and the second dictionary address ADD_M(2) for the third block (see FIG. 7). The first dictionary address ADD_M(1) is an address on the dictionary memory 16 of first dictionary data D1. The second dictionary address ADD_M(2) is an address on the dictionary memory 16 of second dictionary data D2.

As described above, the mirror enable signal EM is "0" for the first or second block and is "1" for the third block. Accordingly, the operation of the shift register 15 for the first or second block is different from that for the third block. On the other hand, the dictionary address ADD_M is the first dictionary address ADD_M(1) for the first block and is the second dictionary address ADD_M(2) for the second or third block. Accordingly, for the second and third blocks, the characteristic portion of the image is recognized using the second dictionary data D2.

The input buffer 14 stores the gradient data GD in a position of a line memory corresponding to the write address WR, and outputs gradient information G stored in a position corresponding to the read address RD from each line memory to the shift register 15. The gradient information G on the 1-line pixels P of the image data IMG is stored in one line memory. For example, in FIG. 2, 18 pieces of gradient information G are stored in one line memory.

The shift register 15 stores gradient information G output by the input buffer 14 on each line. When receiving the shift control signal SC output by the shift controller 12, the shift register 15 shifts the stored gradient information G on each line. FIG. 8 is a schematic diagram of the shift register 15 of the first embodiment. When receiving the shift control signal SC, the shift register 15 shifts the gradient information G in the X-direction such that target gradient information G0 is stored in the register block (4,0). Thus, the pieces of gradient information located within a radius of 4 pixels around the target gradient information G0 are stored in the shift register 15.

Using the dictionary address ADD_M output by the block determining module 13 and a prepared reference table, the shift register 15 generates a reference address ADD_REF on the dictionary memory 16 in which a weight W to be referred to is stored and outputs the reference address ADD_REF to the dictionary memory 16.

FIG. 9 is a schematic diagram of a first reference table of the first embodiment. The first reference table is used to generate a first reference address ADD_REF0 of the first weight W0 corresponding to the target gradient information G0. The first reference table indicates 8 first reference addresses ADD_REF0 corresponding to the target gradient information G0. When the target gradient information G0 is 0 to 7, the first reference address ADD_REF0 is the sum of the dictionary address ADD_M and the target gradient information G0. On the other hand, when the target gradient information G0 is 8, the first reference address ADD_REF0 is not generated.

FIG. 10 is a schematic diagram of a second reference table of the first embodiment. The second reference table is used to generate a second reference address ADD_REFk of the second weight Wk corresponding to co-occurrence gradient information Gk. The second reference table indicates 64 second reference addresses ADD_REFk corresponding to a combination of the target gradient information G0 and the co-occurrence gradient information Gk. When the target gradient information G0 and the co-occurrence gradient information Gk are 0 to 7, the second reference address ADD_REFk is the sum of the dictionary address ADD_M and a constant Ck. The constant Ck is 64 values corresponding to the combination of the target gradient information G0 and the co-occurrence gradient information Gk. On the other hand, when at least one of the target gradient information G0 and the co-occurrence gradient information Gk is 8, the second reference address ADD_REFk is not generated.

Figure 11:
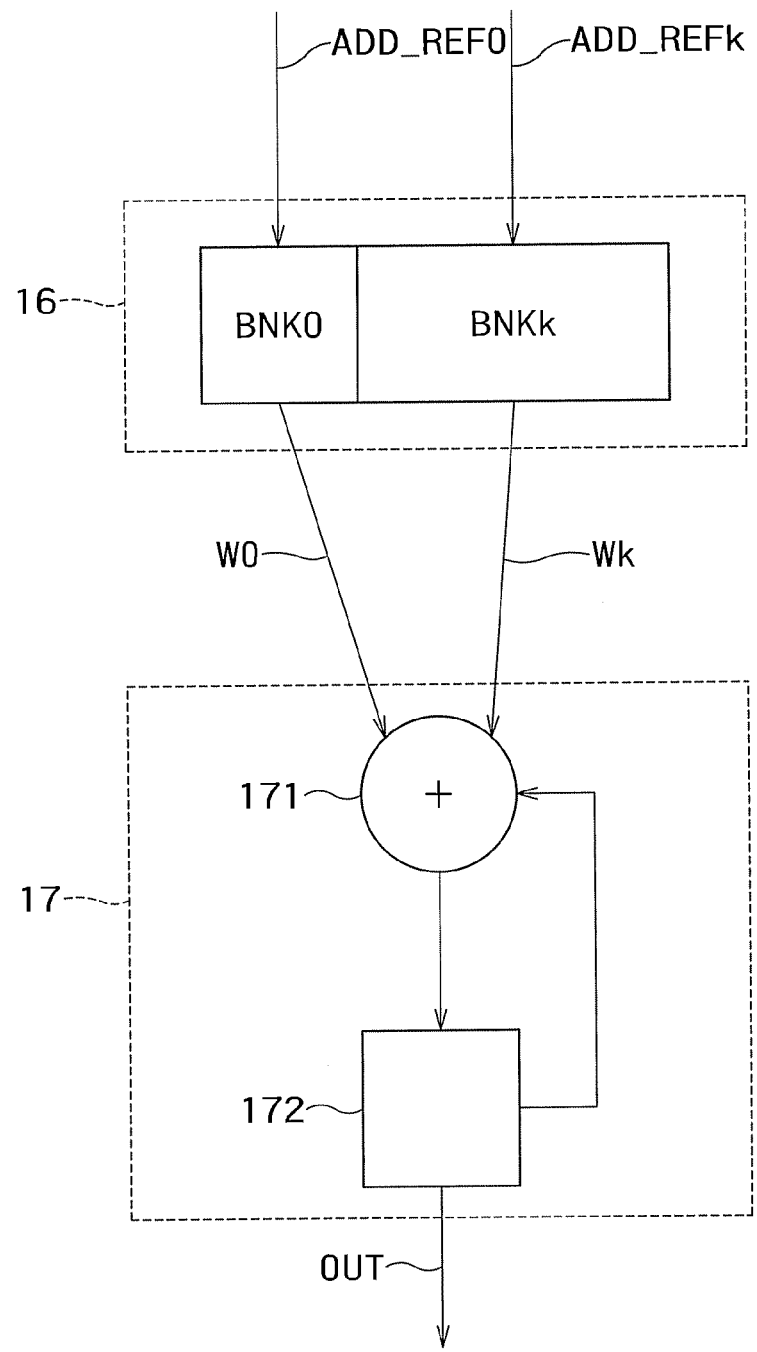
FIG. 11 is a block diagram of the dictionary memory 16 and the recognizing module 17 of the first embodiment.

The dictionary memory 16 stores the first dictionary data D1 for the first block and the second dictionary data D2 for the second block. The recognizing module 17 generates a recognition result OUT using the dictionary data D and outputs the recognition result OUT. FIG. 11 is a block diagram of the dictionary memory 16 and the recognizing module 17 of the first embodiment.

The dictionary memory 16 includes a first bank BNK0 and plural second banks BNKk. The first weight set 0 for the first block and the first weight set 0 for the second block are stored in the first bank BNK0. The second weight set k for the first block and the second weight set k for the second block are stored in the second bank BNKk. In the case of FIG. 2, the 12 first weight sets 0 are stored in the first bank BNK0 and the 12 second weight sets k are stored in the second bank BNKk. The weight set for the third block is stored in neither the first bank BNK0 nor the second bank BNKk.

Figure 12:
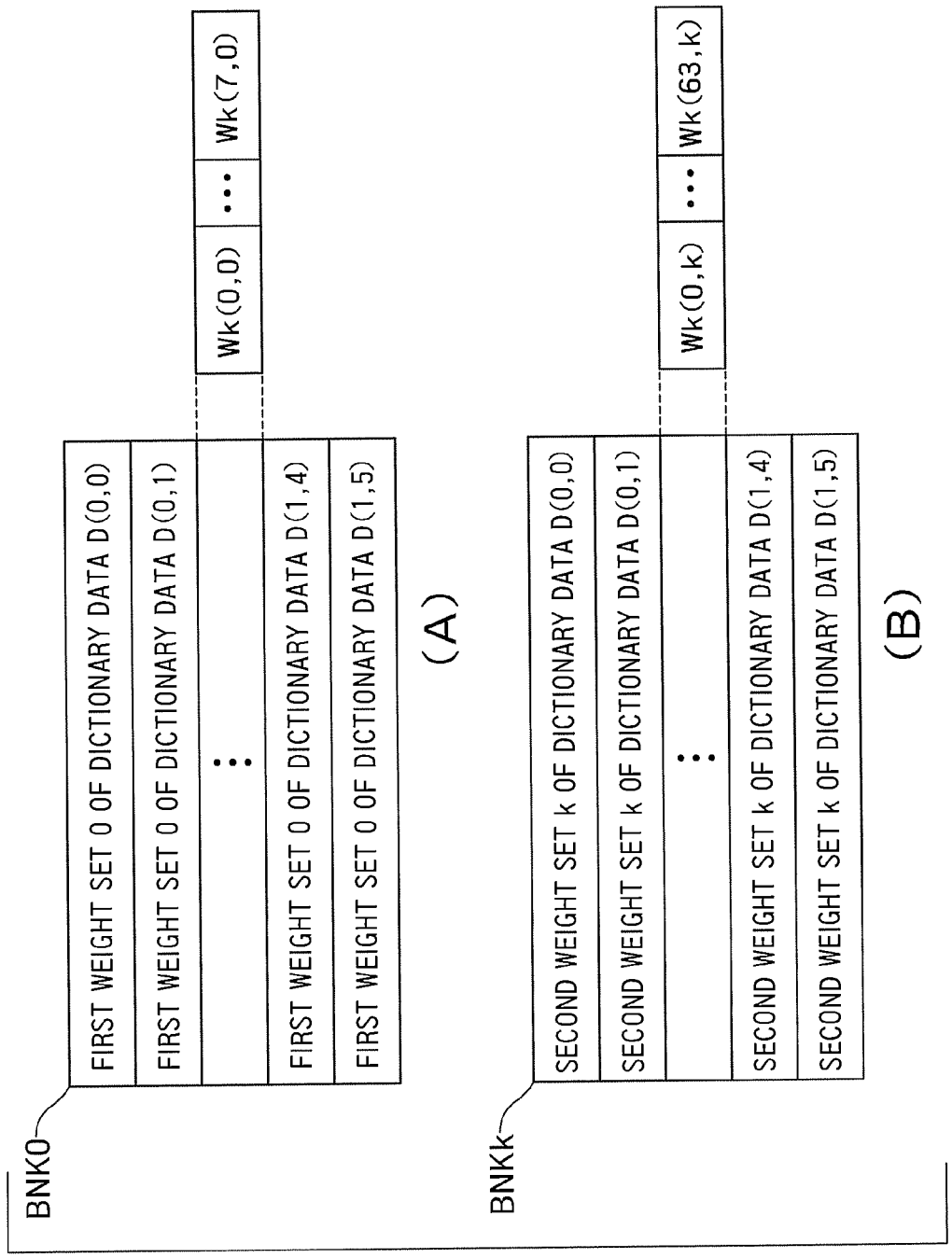
FIG. 12 is a view illustrating pieces of data stored in the first bank BNK0 and the second bank BNKk of the first embodiment.

FIG. 12 is a view illustrating pieces of data stored in the first bank BNK0 and the second bank BNKk of the first embodiment. For example, the first weight sets 0 of the dictionary data D(0,0) for the block BLK(0,0) to the dictionary data D(1,5) for the block BLK(1,5) are stored in the first bank BNK0 (see FIG. 12A). On the other hand, the second weight sets k of the dictionary data D(0,0) for the block BLK(0,0) to the dictionary data D(1,5) for the block BLK(1,5) are stored in the second bank BNKk (see FIG. 12B). Addresses on the dictionary memory 16 are allocated to the weights W of the first weight set 0 and the second weight set k. When receiving the reference address ADD_REF output by the shift register 15, the dictionary memory 16 outputs the weight W stored in the reference address ADD_REF to the recognizing module 17.

The recognizing module 17 recognizes the characteristic portion of the image using the dictionary data D of the SVM. The recognizing module 17 includes an adder 171 and an accumulator 172. The adder 171 adds the plural weights W stored in the dictionary memory 16 and data fed back from the accumulator 172. The accumulator 172 accumulates an output of the adder 171. The accumulator 172 feeds back the accumulated value to the adder 171 until the outputs of the adder 171 for all the pixels P are accumulated, and the accumulator 172 outputs the accumulated value as the recognition result OUT when the outputs of the adder 171 for all the pixels P are accumulated.

Figure 13:
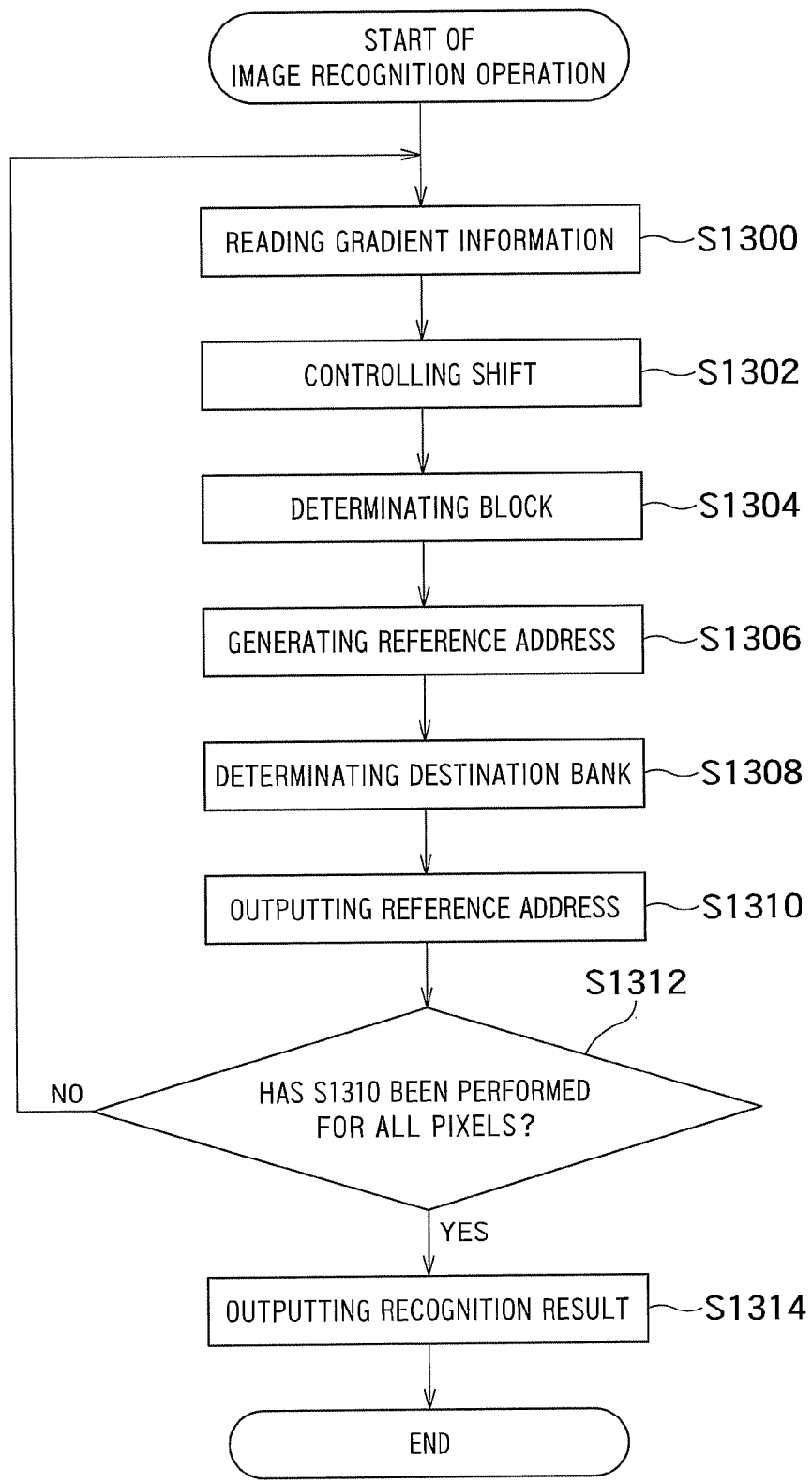
FIG. 13 is a flowchart of image recognizing processing of the first embodiment.

An operation of the image recognizing apparatus 10 of the first embodiment will be explained below. FIG. 13 is a flowchart of image recognizing processing of the first embodiment. The image recognizing processing of FIG. 13 is performed after the gradient data GD is stored in the input buffer 14.

<S1300> The shift controller 12 generates the read address RD and the read enable signal ER. Therefore, in each line memory of the input buffer 14, the gradient information G stored in the read address RD is transferred to the shift register 15.

<S1302> The shift controller 12 generates the shift control signal SC. Therefore, in the shift register 15, the target gradient information G0 is shifted in the order of the raster scan, and the pieces of gradient information around the target gradient information are also shifted similarly to the target gradient information G0. The shift controller 12 outputs the block position information BP on the target block to the block determining module 13.

<S1304> The block determining module 13 determines the type of the target block based on the block position information BP and the determination table, and generates the mirror enable signal EM and the dictionary address ADD_M according to the type of the target block.

<S1306> The shift register 15 generates the reference address ADD_REF by a method corresponding to the mirror enable signal EM. FIG. 14 is a view illustrating the block determination of the first embodiment.

Figures 14A, 14B:
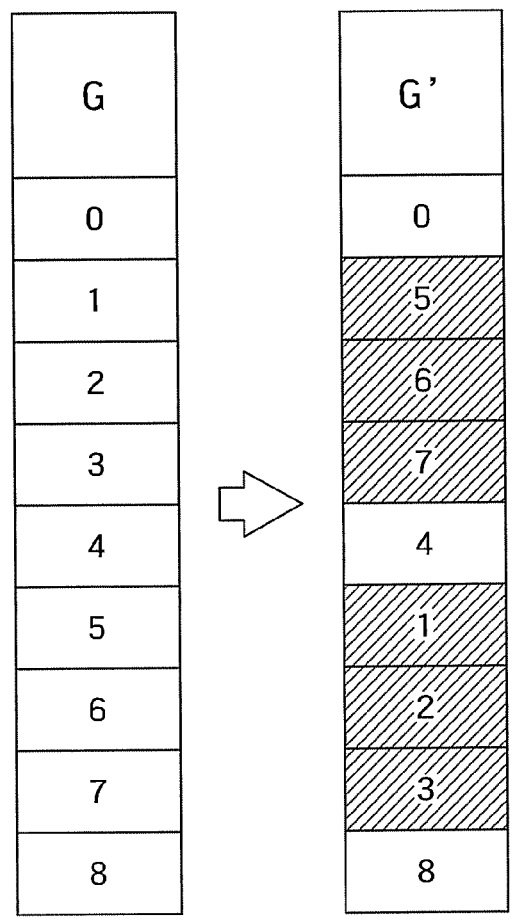
FIGS. 14A and 14B are views illustrating the block determination of the first embodiment.

For the mirror enable signal EM=0 (that is, the first or second block), the shift register 15 generates the first reference address ADD_REF0, the second reference address ADD_REFk and the dictionary address ADD_M (see FIG. 14A). The first reference address ADD_REF0 is the sum of the target gradient information G0 and the dictionary address ADD_M. The second reference address ADD_REFk is the sum of the constant Ck corresponding to the target gradient information G0 and co-occurrence gradient information Gk.

On the other hand, for the mirror enable signal EM=1 (that is, the third block), the shift register 15 rewrites the target gradient information G0 and the co-occurrence gradient information Gk into values indicating the opposite gradient directions, and generates target gradient information G'0 and co-occurrence gradient information G'k, respectively (see FIG. 14B). For example, the target gradient information G0=1 is rewritten into the target gradient information G'0=5, and the co-occurrence gradient information Gk=7 is rewritten into the co-occurrence gradient information G'k=3. Then the shift register 15 generates the first reference address ADD_REF0 and the second reference address ADD_REFk (see FIG. 14A). The first reference address ADD_REF0 is the sum of the target gradient information G'0 and the dictionary address ADD_M. The second reference address ADD_REFk is the sum of the constant Ck and the dictionary address ADD_M. The constant Ck corresponds to the target gradient information G'0 and co-occurrence gradient information G'k.

That is, for the first or second block, the first reference address ADD_REF0 corresponding to the direction of the target gradient information G0, and the second reference address ADD_REFk corresponding to the directions of the target gradient information G0 and co-occurrence gradient information Gk are generated for the first or second block. On the other hand, for the third block, the first reference address ADD_REF0 corresponding to the direction of the target gradient information G'0, and the second reference address ADD_REFk corresponding to the directions of the target gradient information G'0 and co-occurrence gradient information G'k are generated.

<S1308> The shift register 15 determines a destination bank of the second reference address ADD_REFk by the method corresponding to the mirror enable signal EM. FIG. 15 is a view illustrating the determination of the destination bank of the first embodiment.

Figure 15A:
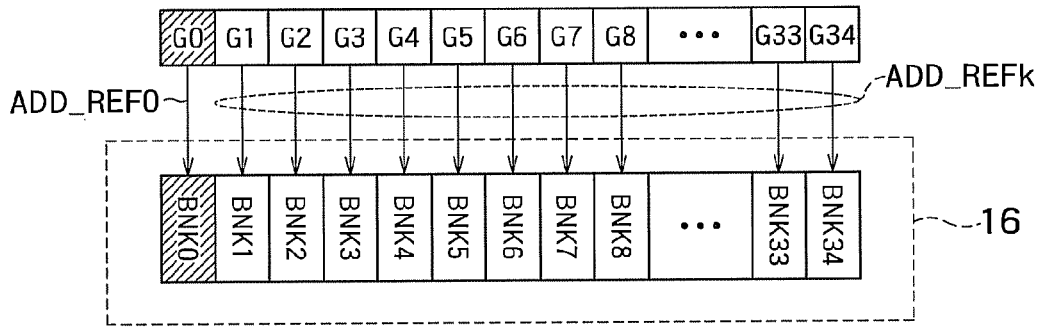
FIGS. 15A and 15B are views illustrating the determination of the destination bank of the first embodiment.

For the mirror enable signal EM=0 (that is, the first or second block), the shift register 15 determines the first bank BNK0 as the destination of the first reference address ADD_REF0 and determines the second bank BNKk as the destination of the second reference address ADD_REFk (see FIG. 15A). For example, the destination of the second reference address ADD_REF1 is the second bank BNK1, and the destination of the second reference address ADD_REF8 is the second bank BNK8.

Figure 15B:
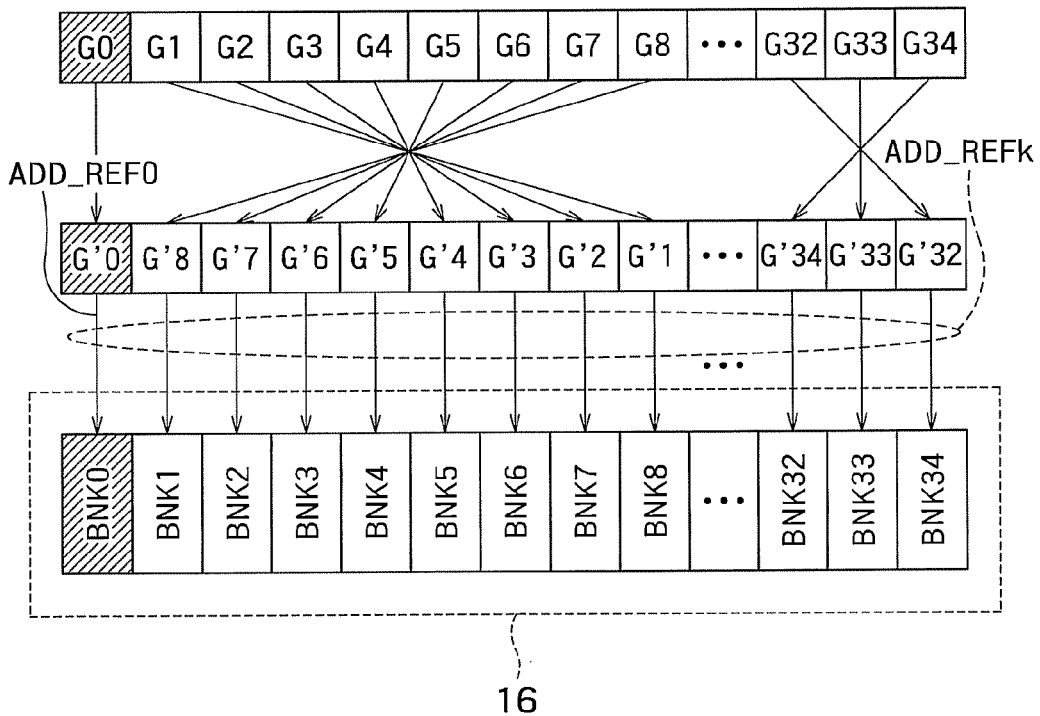

On the other hand, for the mirror enable signal EM=1 (that is, the third block), the shift register 15 determines the first bank BNK0 as the destination of the first reference address ADD_REF0 and determines a second bank BNKk' different from the second bank BNKk for the mirror enable signal EM=0 as the destination of the second reference address ADD_REFk (see FIG. 15B). For example, the destination of the second reference address ADD_REF1 is the second bank BNK8, and the destination of the second reference address ADD_REF8 is the second bank BNK1.

<S1310> The shift register 15 outputs the first reference address ADD_REF0 and second reference address ADD_REFk generated in S1306 to the destination bank determined in S1308. The dictionary memory 16 outputs the first weight W0 stored in the first reference address ADD_REF0 and the second weight Wk stored in the second reference address ADD_REFk to the recognizing module 17. The adder 171 adds the first weight W0, the second weight Wk and the addition result fed back from the accumulator 172. The accumulator 172 accumulates the addition results of the adder 171.

<S1312 and S1314> S1300 to S1310 are repeated until S1310 is completed for all the pixels constituting the image data IMG (NO in S1312). When S1310 is completed for all the pixels constituting the image data IMG (YES in S1312), the accumulator 172 outputs the addition result (that is, the sum of the first weights W0 and the second weights Wk for all the pixels of the image data IMG) as the recognition result OUT (S1314).

According to the first embodiment, the first dictionary data D1 for the first block on the central axis of the image and the second dictionary data D2 for the second block on one side in relation to the central axis of the image are prepared. The first dictionary data D1 is used for the first block, and the second dictionary data D2 is used for the second block. For the third block having the mirror relationship with the second block, the second dictionary data D2 is used while the gradient information G and the destination bank are changed in consideration of the mirror relationship. That is, the second dictionary data D2 referred to can be shared between the second and third blocks. Therefore, the data amount of the dictionary data D necessary to recognize the characteristic portion of the image can be reduced to recognize the characteristic portion of the image with the small-capacity dictionary memory 16.

Second Embodiment

Figure 16:
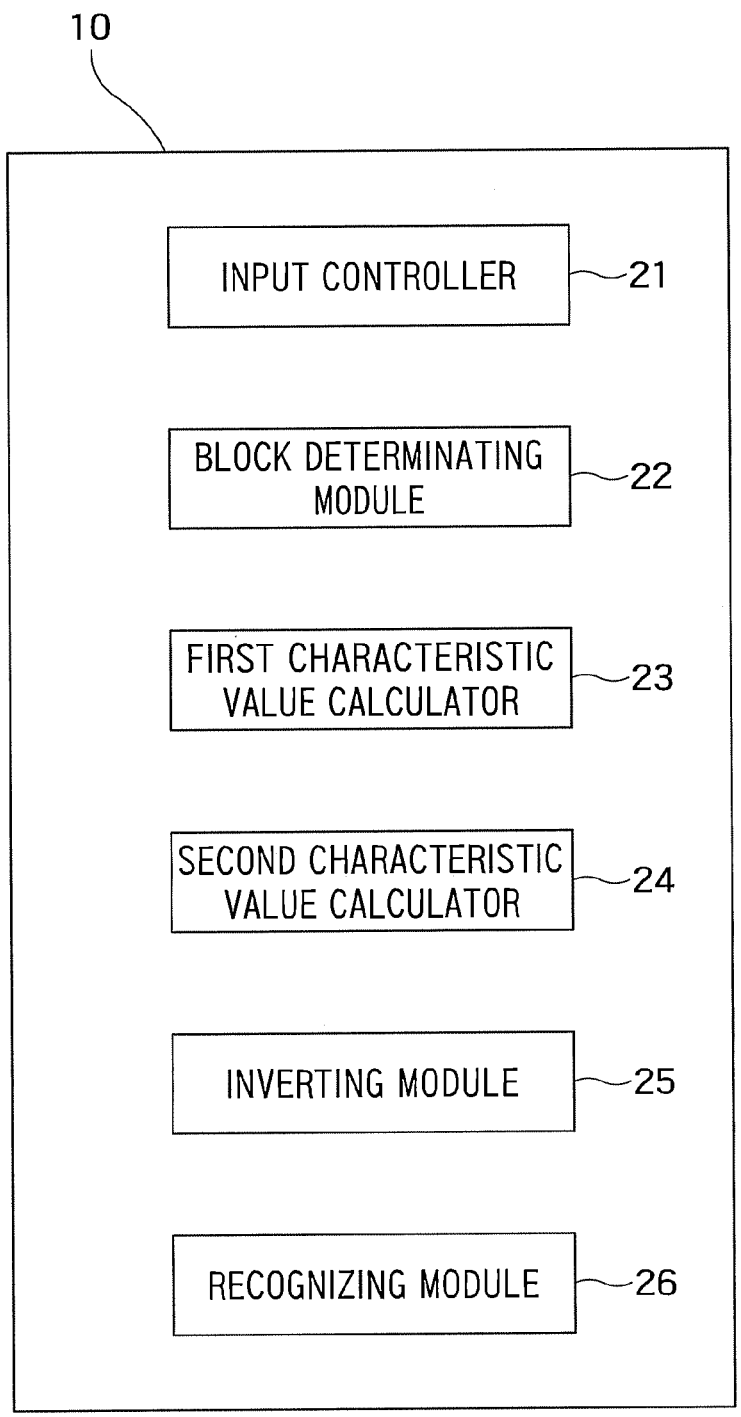
FIG. 16 is a block diagram of an image recognizing apparatus 10 of the second embodiment.

A second embodiment will be explained below. In the second embodiment, by way of example, an image data block is inverted based on a mirror relationship. The description similar to that of the first embodiment is omitted. FIG. 16 is a block diagram of an image recognizing apparatus 10 of the second embodiment. The image recognizing apparatus 10 is implemented by a computer processor (for example, CPU (Central Processing Unit)). The image recognizing apparatus 10 includes an input controller 21, a block determining module 22, a first characteristic value calculator 23, a second characteristic value calculator 24, an inverting module 25 and a recognizing module 26.

Figure 17:
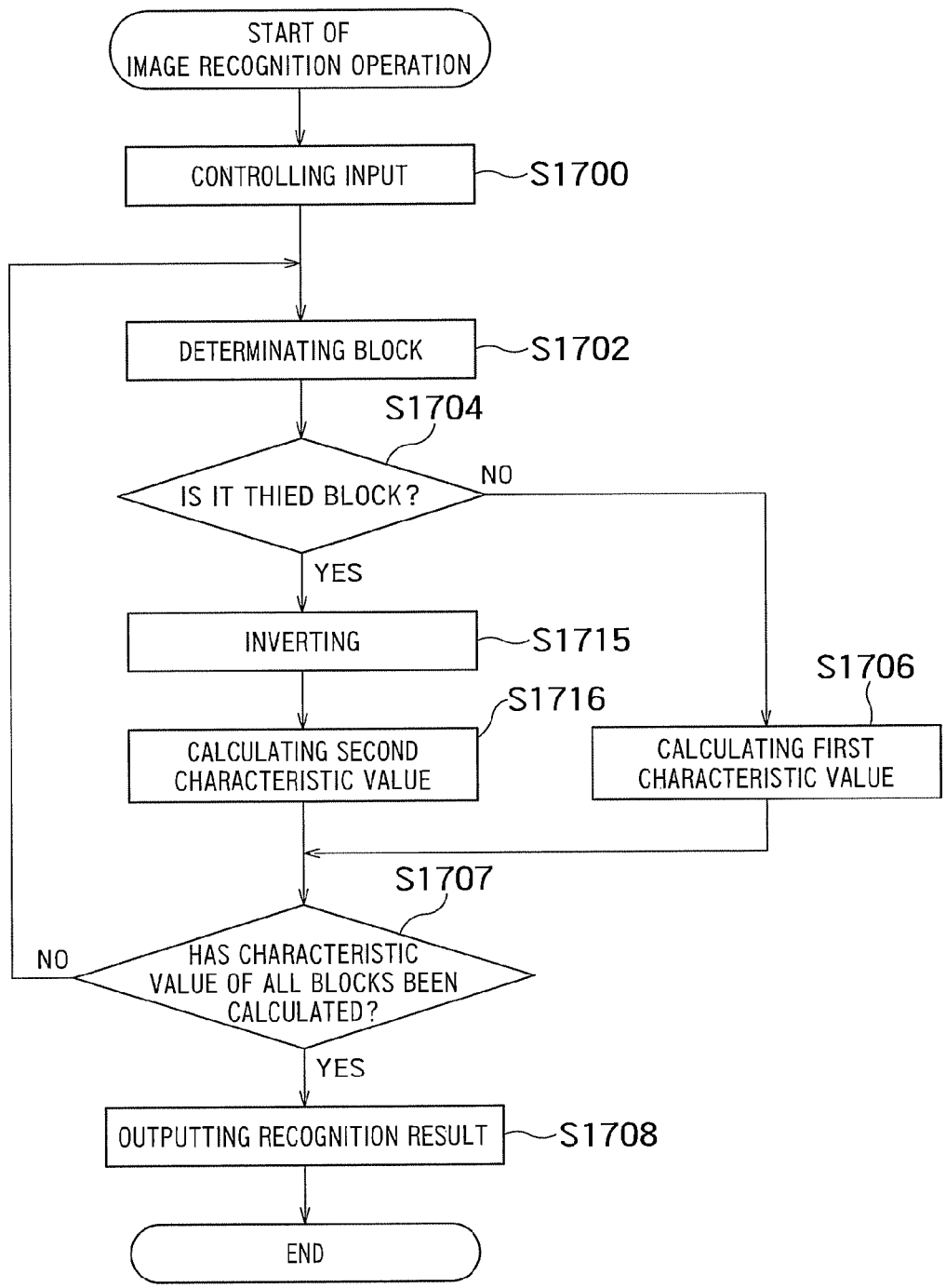
FIG. 17 is a flowchart of image recognizing processing of the second embodiment.

An operation of the image recognizing apparatus of the second embodiment will be explained below. FIG. 17 is a flowchart of image recognizing processing of the second embodiment. The image recognizing processing is performed by the image recognizing apparatus 10.

<S1700 to S1704> The input controller 21 inputs the image data IMG indicating the image to be recognized from the main memory 40 (S1700). The block determining module 22 determines the type of the target block of the image data IMG (S1702). S1702 is similar to S1304 of the first embodiment. For the third block (YES in S1704), the flow goes to S1705. For the first or second block (NO in S1704), the flow goes to S1716.

<S1706> For example, using an equation 1, the first characteristic value calculator 23 calculates a first vector F1 indicating a first characteristic value of the first or second block from the pixel values of the plural pixels in the target block. In the equation 1, d is a predetermined constant, and x is a coordinate of a reference point when the co-occurrence pixel is fixed. Similarly to the HOG characteristic value indicated by the equation 1, the first characteristic value calculator 23 can also calculate the first vector F1 for arbitrary characteristic values such as an LBP (Local Binary Pattern) characteristic value, a Haar-Wavelet characteristic value, an Edgelet characteristic value and a Shapelet characteristic value.

[Formula 1]

$$F_d(i, j) = \sum_x \text{Equa}(G(x), i)\text{Equal}(G(x+d), j) \quad \text{(equation 1)}$$

<S1715 and S1716> The inverting module 25 inverts pieces of position information on the plural pixels in the target block to generate an inverted block (S1715). The image of the inverted block is symmetrical to the image of the target block in relation to the Z-axis. Using the equation 1, the second characteristic value calculator 24 calculates a second vector F2 indicating a second characteristic value of the third block from the pixel values of the plural pixels in the inverted block (S1716).

Figure 18:
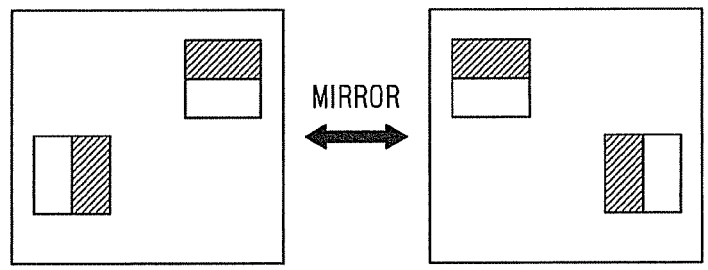
FIG. 18 is a view illustrating the determination of the block of the second embodiment.
Figure 19:
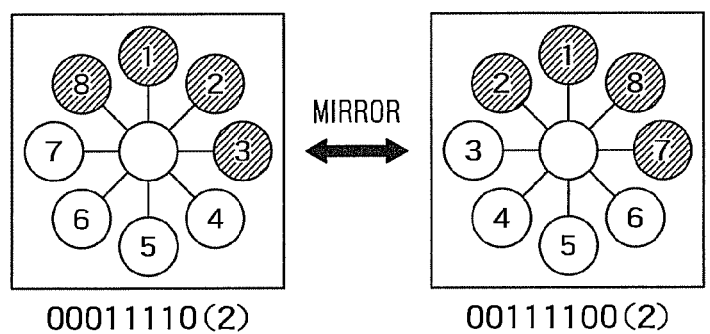
FIG. 19 illustrates inverting and calculating the second characteristic value.
Figure 20A:
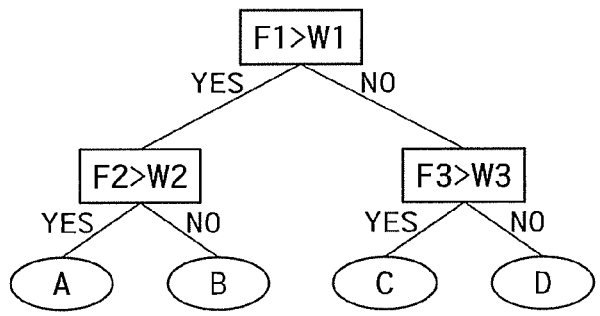
FIGS. 20A and 20B illustrate recognizing inverting and calculating the second characteristic value.
Figure 20B:
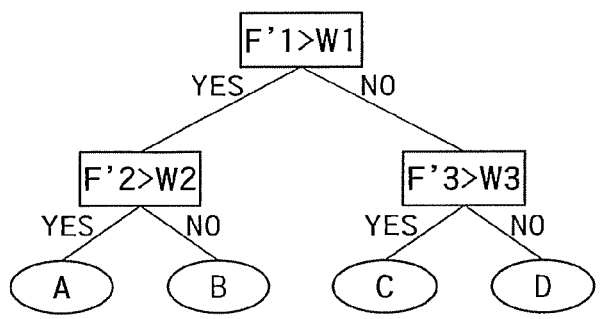

S1706 and S1716 are not limited to those in the second embodiment. For example, when the CoHOG characteristic value is generated, the same effect is obtained even if the calculation is performed while d of the equation 1 is changed to a symmetrical position in relation to the position of the target pixel, and the procedure for rewriting the gradient value as illustrated in FIG. 14B is used (see FIG. 18). Therefore, S1715 can be omitted. For example, when the Haar-Wavelet characteristic value is generated, a sign of the third block may be inverted to calculate the second vector F2 as illustrated in FIG. 19. For example, when the LBP characteristic value is generated, the sequence is changed in coding a magnitude relation for the third block to calculate the second vector F2 as illustrated in FIG. 20.

<S1707 and S1708> S1702 to S1706, S1715 and S1716 are repeated until the characteristic values are calculated for all the blocks constituting the image data IMG (NO in S1707). When the characteristic values are calculated for all the blocks constituting the image data IMG (YES in S1707), the recognizing module 26 outputs the recognition result OUT of the image for the first vector F1 and the second vector F2 using the same weight W. For example, the recognition result OUT is expressed by an equation 2 in the recognition in which the linear SVM is used. As shown in the equation 2, the data amount of the dictionary data D can be reduced because the weight W is shared by the first vector F1 and the second vector F2. For example, the recognition result OUT is expressed by an equation 3 in the recognition in which Adaboost is used. In the equation 3, h(f) is the second characteristic value and h'(f') is a weak recognizer. As shown in the equation 3, the data amount of the dictionary data D can be reduced because the weight W is shared by the second characteristic value h(f) and the weak recognizer h'(f'). For example, the dictionary data D can be shared by the determining tree illustrated in FIG. 20A and a determining tree illustrated in FIG. 20B in the recognition in which Random Forest is used.

[Formula 2]

$$SVM(F) = \text{sign}(WF_1 + WF_2) = \text{sign}(W(F_1 + F_2)) \quad \text{(equation 2)}$$

[Formula 3]

$$Adaboost(F) = \text{sign}\left(\sum_i W_i(h_i(f_i) + h'_i(f'_i))\right) \quad \text{(equation 3)}$$

According to the second embodiment, the second characteristic value is calculated after the image of the third block is inverted, which allows the dictionary data D to be shared by the second and third blocks. Therefore, the data amount of the dictionary data D necessary to recognize the characteristic portion of the image can be reduced. That is, the characteristic portion of the image can be recognized with the small-capacity dictionary memory 16.

In the embodiments described above, by way of example, the determination table includes the information in which the Z-axis is located between the shared block and the mirror block. However, the scope of the invention is not limited to the embodiments. The determination table may include information indicating whether the block is the mirror block (that is, the block in which the second dictionary data of the shared block is used) or not.

At least a portion of an image recognizing apparatus according to the above-described embodiments may be composed of hardware or software. When at least a portion of the image recognizing apparatus is composed of software, a program for executing at least some functions of the image recognizing apparatus may be stored in a recording medium, such as a flexible disk or a CD-ROM, and a computer may read and execute the program. The recording medium is not limited to a removable recording medium, such as a magnetic disk or an optical disk, but it may be a fixed recording medium, such as a hard disk or a memory.

In addition, the program for executing at least some functions of the image recognizing apparatus according to the above-described embodiment may be distributed through a communication line (which includes wireless communication) such as the Internet. In addition, the program may be encoded, modulated, or compressed and then distributed by wired communication or wireless communication such as the Internet. Alternatively, the program may be stored in a recording medium, and the recording medium having the program stored therein may be distributed."

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An image recognizing apparatus comprising:
a dictionary memory configured to store first dictionary data and second dictionary data different from the first dictionary data;
a block determining module configured to determine that a target block comprising a target pixel to be processed of a plurality of pixels in image data is a shared block to which the second dictionary data is used, a mirror block to which the second dictionary data is used, or an unshared block to which the first dictionary data is used, based on a position of the target block; and
a recognizing module configured to use the first dictionary data for the unshared block and the second dictionary data for the shared block and the mirror block, and recognize characteristic portion of the image expressed by the image data.

2. The apparatus of claim 1, further comprising a shift register configured to store gradient information indicating a gradient direction of each pixel, wherein
the block determining module generates a first dictionary address on the dictionary memory in which the first dictionary data is stored when the target block is the unshared block, and generates a second dictionary address on the dictionary memory in which the second dictionary data is stored when the target block is the shared block or the mirror block,
the shift register generates a first reference address on the dictionary memory in which a weight of the first dictionary data is stored by using the first dictionary address and generates a second reference address on the dictionary memory in which a weight of the second dictionary data is stored by using the second dictionary address, and
the recognizing module accumulates the weights stored in the first reference address and the second reference address to recognize the characteristic portion.

3. The apparatus of claim 2, wherein the shift register generates the first reference address in accordance with target gradient information of the target pixel, and generates the second reference address in accordance with a combination of co-occurrence gradient information of a co-occurrence pixel having a co-occurrence relationship with the target pixel and the target gradient information.

4. The apparatus of claim 3, wherein
the first reference address is a sum of the first dictionary address and the target gradient information or a sum of the second dictionary address and the target gradient information, and
the second reference address is a sum of the first dictionary address and a constant in accordance with the combination or a sum of the second dictionary address and the constant.

5. The apparatus of claim 3, wherein the shift register uses a reference table indicating a relationship of the target gradient information, the co-occurrence gradient information and the second reference address to generate the second reference address.

6. The apparatus of claim 1, further comprising:
a first characteristic value calculator configured to calculate a first characteristic value based on the pixels in the target block when the target block is the shared block;
an inverting module configured to invert coordinates of the pixels in the target block to generate an inverted block when the target block is the shared block; and
a second characteristic value calculator configured to calculate a second characteristic value based on the pixels in the inverted block, wherein
the recognizing module uses the first characteristic value and the second characteristic value to recognize the characteristic portion.

7. A method for recognizing a characteristic portion of an image with a dictionary memory storing first dictionary data and second dictionary data different from the first dictionary data, the method comprising:
determining that a target block comprising a target pixel to be processed of a plurality of pixels in image data is a shared block to which the second dictionary data is used, a mirror block to which the second dictionary data is used or a unshared block to which the first dictionary data is used, based on a position of the target block; and
recognizing the characteristic portion by using the first dictionary data for the unshared block and the second dictionary data for the shared block and the mirror block.

8. The method of claim 7, further comprising:
generating a first dictionary address on the dictionary memory in which the first dictionary data is stored when the target block is the unshared block;
generating a second dictionary address on the dictionary memory in which the second dictionary data is stored when the target block is the shared block or the mirror block;
generating a first reference address on the dictionary memory in which a weight of the first dictionary data is stored by using the first dictionary address; and
generating a second reference address on the dictionary memory in which a weight of the second dictionary data is stored by using the second dictionary address, wherein
in recognizing the characteristic portion, the weights stored in the first reference address and the second reference address are accumulated.

9. The method of claim 8, wherein
in generating the first reference address, the first reference address in accordance with target gradient information of the target pixel is generated, and
in generating the second reference address, the second reference address in accordance with a combination of co-occurrence gradient information of a co-occurrence pixel having a co-occurrence relationship with the target pixel and the target gradient information is generated.

10. The method of claim 9, wherein
the first reference address is a sum of the first dictionary address and the target gradient information or a sum of the second dictionary address and the target gradient information, and
the second reference address is a sum of the first dictionary address and a constant in accordance with the combination or a sum of the second dictionary address and the constant.

11. The method of claim 10, wherein in generating the second reference address, a reference table indicating a relationship of the target gradient information, the co-occurrence gradient information and the second reference address is used.

12. The method of claim 7, further comprising:
calculating a first characteristic value based on the pixels in the target block when the target block is the shared block;
inverting coordinates of the pixels in the target block to generate an inverted block when the target block is the shared block; and
calculating a second characteristic value based on the pixels in the inverted block, wherein
in recognizing the characteristic portion, the first characteristic value and the second characteristic value are used.

13. A non-transitory computer readable medium configured to store a program for recognizing a characteristic portion of an image with a dictionary memory storing first dictionary data and second dictionary data different from the first dictionary data, the program comprising instructions for:
determining that a target block comprising a target pixel to be processed of a plurality of pixels in image data is a shared block to which the second dictionary data is used, a mirror block to which the second dictionary data is used or a unshared block to which the first dictionary data is used, based on a position of the target block; and
recognizing the characteristic portion by using the first dictionary data for the unshared block and the second dictionary data for the shared block and the mirror block.

14. The medium of claim 13, further comprising:
generating a first dictionary address on the dictionary memory in which the first dictionary data is stored when the target block is the unshared block;
generating a second dictionary address on the dictionary memory in which the second dictionary data is stored when the target block is the shared block or the mirror block;
generating a first reference address on the dictionary memory in which a weight of the first dictionary data is stored by using the first dictionary address; and
generating a second reference address on the dictionary memory in which a weight of the second dictionary data is stored by using the second dictionary address, wherein
in recognizing the characteristic portion, the weights stored in the first reference address and the second reference address are accumulated.

15. The medium of claim 14, wherein
in generating the first reference address, the first reference address in accordance with target gradient information of the target pixel is generated, and
in generating the second reference address, the second reference address in accordance with a combination of co-occurrence gradient information of a co-occurrence pixel having a co-occurrence relationship with the target pixel and the target gradient information is generated.

16. The medium of claim 15, wherein the first reference address is a sum of the first dictionary address and the target gradient information or a sum of the second dictionary address and the target gradient information, and the second reference address is a sum of the first dictionary address and a constant in accordance with the combination or a sum of the second dictionary address and the constant.

17. The medium of claim 16, wherein in generating the second reference address, a reference table indicating a relationship of the target gradient information, the co-occurrence gradient information and the second reference address is used.

* * * * *